United States Patent
Pauls et al.

(10) Patent No.: US 9,426,115 B1
(45) Date of Patent: Aug. 23, 2016

(54) MESSAGE DELIVERY SYSTEM AND METHOD WITH QUEUE NOTIFICATION

(71) Applicant: Solace Systems, Inc., Ottawa (CA)

(72) Inventors: Duane Pauls, Stittsville (CA); Richard Chan, Kanata (CA); Ragnar Paulson, Nepean (CA); Tony Zoght, Stittsville (CA); Jonathan Bosloy, Kanata (CA); Shawn McAllister, Manotick (CA)

(73) Assignee: Solace Systems, Inc., Ottawa, ON (CA)

( * ) Notice: Subject to any disclaimer, the term of this patent is extended or adjusted under 35 U.S.C. 154(b) by 524 days.

(21) Appl. No.: 13/652,372

(22) Filed: Oct. 15, 2012

(51) Int. Cl.
  *G06F 15/16* (2006.01)
  *H04L 12/58* (2006.01)

(52) U.S. Cl.
  CPC ........... *H04L 51/28* (2013.01); *H04L 51/04* (2013.01); *H04L 51/30* (2013.01); *H04L 51/36* (2013.01); *H04L 51/14* (2013.01)

(58) Field of Classification Search
  CPC ... H04L 51/32; H04L 12/5895; H04L 12/587; H04L 51/26; G06F 9/542; G06F 9/546
  See application file for complete search history.

(56) References Cited

U.S. PATENT DOCUMENTS

| | | | |
|---|---|---|---|
| 7,627,570 B2 | 12/2009 | Bosloy et al. | |
| 7,716,525 B1 | 5/2010 | Buchko et al. | |
| 7,801,857 B2 | 9/2010 | Betts et al. | |
| 2004/0078440 A1* | 4/2004 | Potter et al. | 709/206 |
| 2008/0183825 A1* | 7/2008 | Alicherry et al. | 709/206 |
| 2009/0182574 A1* | 7/2009 | Beardall et al. | 705/1 |
| 2010/0057769 A1* | 3/2010 | Lippert et al. | 709/206 |
| 2011/0258268 A1* | 10/2011 | Banks | G06Q 10/06 709/206 |
| 2013/0165171 A1* | 6/2013 | Pai et al. | 455/518 |

\* cited by examiner

*Primary Examiner* — Liangche A Wang
*Assistant Examiner* — Ayele Woldemariam
(74) *Attorney, Agent, or Firm* — Marks & Clerk; Richard J. Mitchell

(57) ABSTRACT

In a message delivery system, messages are published by publishers and delivered to subscribers based on subscriptions relating to message content. Activation and de-activation notifications are supplied to applications that are bound to a queue in the message delivery system.

14 Claims, 4 Drawing Sheets

MESSAGE DELIVERY SYSTEM AND METHOD WITH QUEUE NOTIFICATION

FIELD OF THE INVENTION

This invention relates to data communication networks and in particular methods of providing notifications of activation and de-activation to applications binding to a queue in a message delivery system.

BACKGROUND OF THE INVENTION

In the prior art, many message delivery systems exist which route messages between endpoints, such as between different applications or clients. The messages may be routed to destination endpoints based on topics, queues, characteristics of the message content or a combination of criteria such as a topic to queue mapping. In the case of a system that routes messages based on topics, there are publishing (or producing) clients that generate messages and subscribing (or consuming) clients that receive messages. A given client may act as both a producer (publisher) and a consumer (subscriber). When a publishing client creates a message it adds to it a topic. Destination endpoints are created by subscribing clients that have associated with them a series of subscriptions (or interests) that are used to attract messages to the subscribing client. Alternately subscriptions may be used to attract messages to a queue endpoint which one or more clients can connect to and receive messages. The topics are typically text strings that often contain sub-fields also known as hierarchical levels but, maybe also be numbers. Interests or subscriptions are of a similar form to the topics but, may contain regular expressions (also known as wild cards) or if the topics are in the form of numbers, the interests could be in the form of a range of numbers. If the messages are to be routed based on the message content then the subscriptions are in the form of regular expressions designed to match a portion of the content or an expression in a query language such as SQL or XPATH (if the message content is in XML format). The interests are gathered by the message delivery system and are used to determine which destination endpoint(s) should receive a copy of a particular message received from a publishing client in a process called matching. In the topic based message delivery system the process of matching involves comparing the topics of messages received from publishing clients to the interests gathered from subscribing clients or queues. A match to an interest is generated when the topic of the incoming messages falls within the regular expression(s) contained in the interest. The present invention is also applicable to systems that route messages based on the content of the message as described in U.S. Pat. No. 7,627,570 and U.S. Pat. No. 7,801,857 the contents of which are herein included by reference.

In the prior art it is common to have two types of queues to hold messages for delivery to subscribing clients: non-exclusive queues and exclusive queues.

With a non-exclusive queues, multiple subscribing clients can connect to or bind to the same queue at the same time, and the messages in the queue are distributed amongst the connected subscribing clients, using algorithms such as round-robin or any other such load sharing mechanisms. This allows a number of subscribing clients to share the workload of the queue, and offers scalability to increase the workload capability and also provides resilience, since there are a number of attached subscribing clients that can service the workload. If a given subscribing client fails, the workload will be shared among the remaining active subscribing clients.

With an exclusive queue, only one subscribing client at a time will receive messages from the queue. The first subscribing client to bind to an exclusive queue will receive all messages. In the preferred embodiment of the prior art, other subscribing applications are also allowed to bind to the same queue, but they will not receive any messages, but simply are on "standby". If the first subscribing client disconnects from the queue, perhaps due to a failure of the client or the interconnecting network, the next subscribing client that had previously bound to the queue will be selected and will become the exclusive recipient of messages from that queue. Such an arrangement is suitable for message flows which only allow a single subscribing client at a time to process the message flow. However, there is still a form of resilience, since if the current active subscribing client fails, another subscribing client, which is waiting will start to receive the messages in the queue.

If the message system of the prior art does not allow multiple subscribing clients to bind to an exclusive queue (with one active and the others in standby), then the alternative is to only allow one to bind (the active one), and reject the bind attempts to the queue for all other subscribing clients. Such rejected subscribing clients would have to poll in the background, i.e. attempt to re-bind to the queue on a timed basis. Alternatively, the clients could communicate amongst themselves to determine when another subscribing client needs to take over from the current active one. Such implementations provide a much slower recovery time due to polling rather than being event driven. Moreover, it greatly increases the complexity of the subscribing client application logic.

In prior art systems that offer queues and allows multiple subscribing clients to bind to the queue, with subscribing clients being active or inactive for message delivery, if a current active subscribing client fails, the system will automatically start delivering messages to the next selected subscribing client. However, in prior art systems there is no notification mechanism to the subscribing clients to tell them, upon binding to the queue, whether the subscribing client is active or not for message reception from the queue. Moreover, the subscribing client is not informed when it becomes active. Rather, it simply starts to receive message from the queue. The subscribing client has to infer it is now the active subscribing client when it receives the first message. However, it may need to take action long before it receives the first message when it is the active subscribing client, such as updating its state, notifying other entities, etc. When it becomes active, there may be no messages available for delivery at that time, and thus a significant amount of time may pass before the next message is available for delivery and thus informing the subscribing client that it is now active. Also, if a client has been selected to be active, but there is something wrong with the publisher(s) that are supposed to places messages into the queue, the client has no way of knowing. A lack of received messages could be due to the client not being selected as active, or because the publisher(s) are not functioning correctly and not producing messages, or the queue might be improperly configured and unable to receive messages (for example, the queue might be listening to the wrong set of topics). There is also no mechanism to inform an application that the message delivery system has decided for some reason, such as an administrative action, to stop delivering messages to the current active subscribing client and has selected a different client to be active.

SUMMARY OF THE INVENTION

The invention provides a message delivery system that includes a method to a) indicate to subscribing clients binding to a queue when they become an active client to receive message from the queue, and b) to indicate to an active subscribing client bound to a queue if it is no longer an active subscribing client. This provides the subscribing clients to a queue the information they need to more effectively participate in message reception from the queue.

According to the present invention there is provided in a message delivery system comprising a queue provisioned for the delivery of messages to a plurality of subscriber clients bound to the queue, wherein a certain number of said subscriber clients can be active at any one time to receive messages from the queue, a method of managing the subscriber clients bound to the queue, comprising the message delivery system: (i) determining which of the subscriber clients bound to the queue is/are currently active; (ii) sending a message to an active subscribing client for the queue indicating that it is currently active; and (iii) sending a message to an inactive subscribing client for the queue indicating that it is currently inactive.

The queue may be an exclusive queue, in which case only one subscribing client may be active at any one time, although it may also be a limited queue in which only a certain number of subscribing clients greater than one may be active at any one time. The limited queue works in essentially the same way as an exclusive queue. For example, if the limited queue will accept six active clients, and a new subscriber client arrives, the system will not be able to accept it as active unless another subscribing client of lower priority is made inactive.

Each time there is a change in active/inactive status, a notification message is sent to the affected subscribing clients.

According to another aspect of the invention there is provided a message delivery system comprising a queue provisioned for the delivery of messages to a plurality of subscriber clients bound to the queue, wherein a certain number of said subscriber clients can be active at any one time to receive messages from the queue; and a processor configured to: (i) determine which of the subscriber clients bound to the queue is/are currently active; (ii) send a message to an active subscribing client for the queue indicating that it is currently active; and (iii) send a message to an inactive subscribing client for the queue indicating that it is currently inactive.

In yet another aspect the invention provides a method of binding a subscriber client to a queue in a message delivery system comprising a queue provisioned for the delivery of messages to a plurality of subscriber clients bound to the queue, wherein a certain number of said subscriber clients can be active at any one time to receive messages from the queue, comprising on receiving a bind request from a new subscriber client, binding the new client to the queue; determining whether to accept the new subscriber client as an active subscriber client; and sending a notification message to the new subscribing client notifying it of its active/inactive status.

BRIEF DESCRIPTION OF THE DRAWINGS

The invention will now be described in more detail, by way of example, with reference to the accompanying drawings, in which.

DETAILED DESCRIPTION OF THE PREFERRED EMBODIMENTS

There are many example message delivery systems known in the art; for example U.S. Pat. No. 7,716,525 (Buchko) herein included by reference describes a method of providing assured message delivery.

Figure 1:
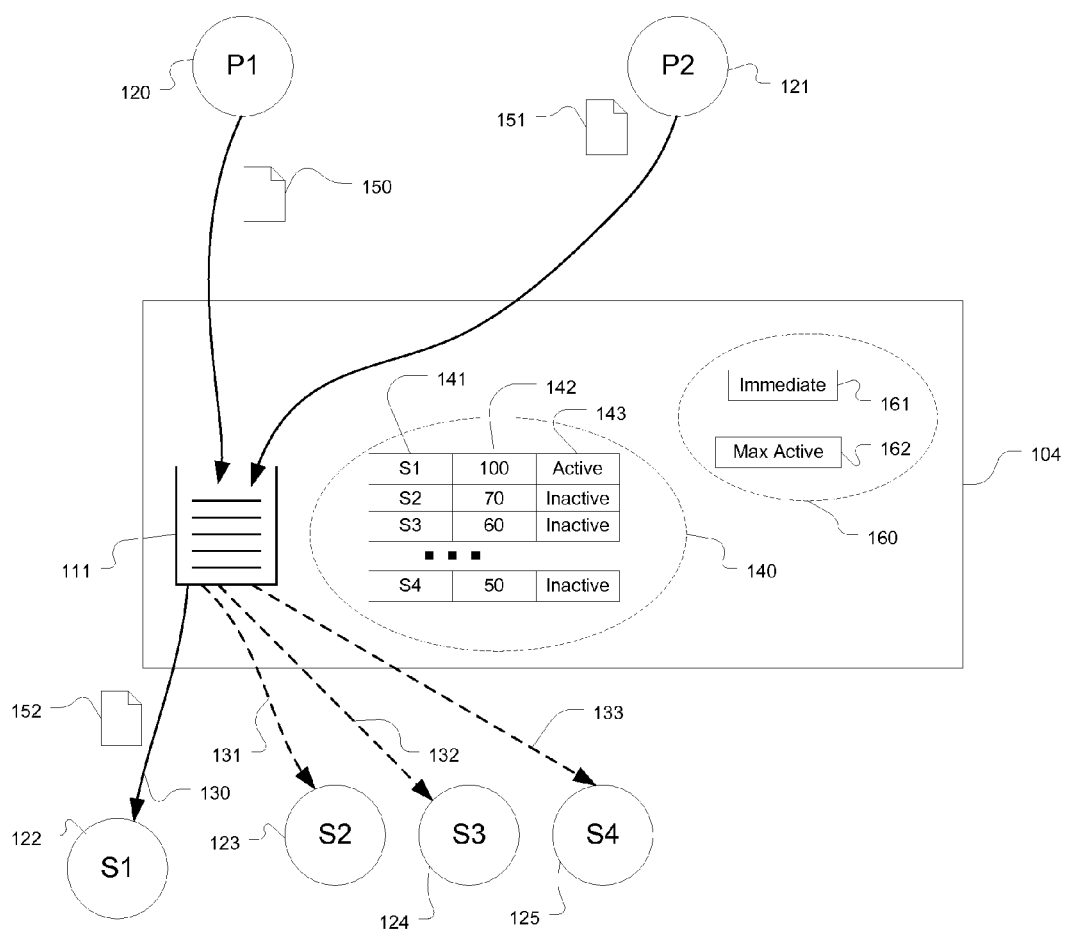
FIG. 1 shows an example message delivery system showing publishing and subscribing clients with a queue with queue notification.

FIG. 1 shows an example message delivery system 104 with a queue 111, two publishing clients 120 and 121, respectively labeled P1 and P2, and four subscribing clients 122, 123, 124, and 125, respectively labeled S1, S2, S3 and S4. The message delivery system 104 may be a network of devices, a single device or a software algorithm distributed among clients. The clients 120-125 are typically software applications running on a general-purpose computer or server but may be any device that is capable of communicating with the message delivery system 104.

The client endpoints 120-125 may produce messages (publisher), consume messages (subscriber) or produce and consume messages (publisher and subscriber). In the example of FIG. 1 the messages 150-151 are transmitted from publishing client(s) 120-121 to queue 111. Four subscribing clients 122-125 are connected to, or bound to, the queue 111, shown respectively by queue flows 130-133. A "flow" indicates that a given client is bound to a specified queue—the client may be active or inactive for that queue at a given time, and thus the flow may be currently in the active state or the inactive state. In FIG. 1, subscribing client 122 is active, represented by the solid line on flow 130, and subscribing clients 123-125 are inactive for the queue (in standby mode), represented by dashed line on flows 131-133. Message 152 on flow 130 is an example of a message being delivered from queue 111 to active subscribing client 122.

Message delivery system 104 contains configuration information 160 for queue 111 to store some configuration options for the queue. Maximum active count 162 determines the maximum simultaneous active subscribers for queue 111. If the maximum active count 162 is set to 1, then queue 111 is an exclusive queue as there can only be one active subscribing client at a time for the queue 111. Any other subscribers bound to the queue 111 at the same time are inactive. If the maximum active count 162 is set to a very large number, or to a special reserved value which means "infinite", then the queue 111 is a non-exclusive queue, and an (effectively) unlimited number of subscribers can be active for queue 111 at the same time. If the maximum active count 162 is set to a number, such as 2, then only that number of subscribers can be active for the queue at the same time, and any additional subscribers bound to the queue 111 are inactive. This makes queue 111 a non-exclusive queue with a limit to the number of active subscribers. Whenever queue 111 is said to be an exclusive queue, the maximum active count 162 is set to 1. Note that the present invention applies equally to a queue 111, which allows only a single active subscribing client or a plurality of active subscribing clients.

Immediate flag 161 determines whether the binding of a new subscribing client to queue 111 has immediate effect or a delayed effect on what subscriber(s) are active for the queue 111, as described later. The priority of a newly bound subscribing client may make it a candidate to be one of the allowed active subscribing clients if priority is used as the basis of selecting the active subscribing clients.

Message delivery system 104 contains state information 140 for queue 111 to keep track of which subscribing clients (field 141) are bound to queue 111, an optional priority value (field 142) for each bound subscriber, where in this example a higher priority number indicates a greater or more important priority for the selection of the active subscribing client, and a status value (field 143) for each bound subscriber indicating whether the subscriber is an active subscribing client 122 or one of the inactive subscribing clients 123-125 for the queue 111. While in this example state information 140 contains four subscribers, it can contain information for any number of subscribers. While the example state information 140 shows a single active client, there can be a plurality of active subscribing clients and a plurality of inactive subscribing clients for queue 111, as controlled by maximum active count 162.

Figure 2:
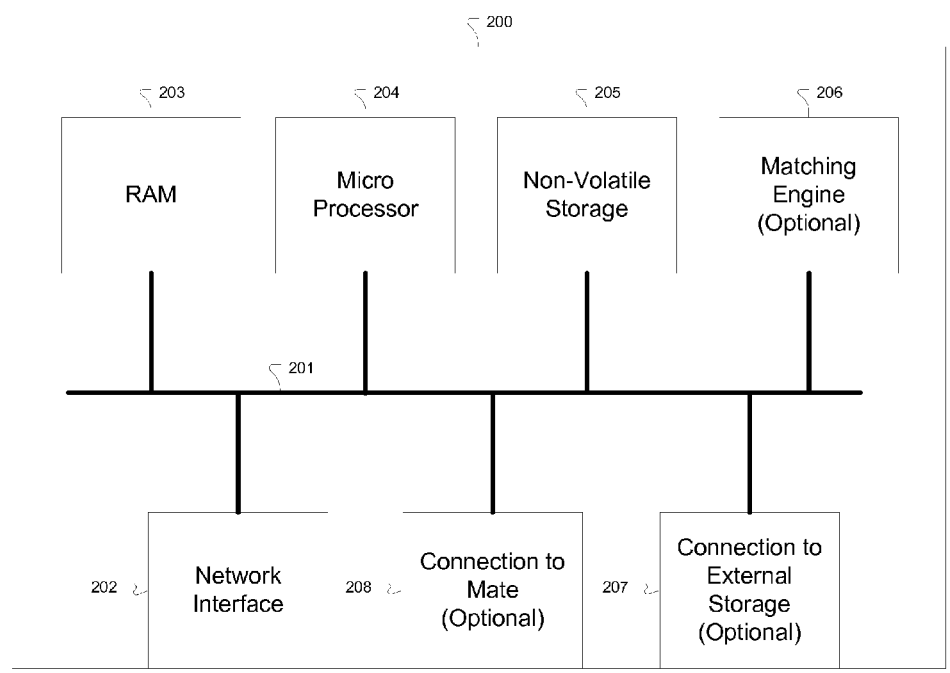
FIG. 2 shows a block diagram of an assured message delivery system.

FIG. 2 shows an example implementation of a message delivery system 200 capable of providing assured message delivery. In the example implementation there is a network interface 202, used by the message delivery system 200 to communicate with client systems 120-125 of FIG. 1. The network interface 202 implements a standard networking protocol such as Ethernet or Infiniband; messages received from publishing clients or sent to subscribing clients must pass through the network interface 202. Any communication received from a client must traverse the system bus 201 and be placed in random access memory or RAM 203, as it is known in the art. The system bus 201 is a communication path inside the message delivery system 200 for which many protocols exist and are well known in the art. The system bus 201 could be implemented using PCI express or other protocol or a combination of different bus protocols connected by components know in the art as bridges and switches. Any communications to or from a client must exist in RAM 203 and is transferred to or from the network interface 202 by direct memory access or DMA as it is known in the art. Communication from clients such as messages from publishing clients once in RAM 203 can be inspected by a micro processor 204.

The microprocessor 204 is shown as a single entity however, there may be multiple microprocessors present in the system, each of which may contain multiple processing cores. The microprocessor 204 is responsible for receiving all stimuli from clients and generating all responses. Assured message delivery systems must be resilient to a variety of different failures such as a component failure, loss of power, system crash, network failure, client failure or other; messages received from publishing clients along with delivery status of destination clients must be stored in non-volatile storage 205 so that the system can recover from failure with no loss of information. Non-volatile storage 205 may be in the form of a disk, solid state disk (SSD), battery backed RAM, capacitor backed RAM, or a combination of RAM and other non-volatile storage as described by Buchko. Some prior art implementations of assured message delivery systems utilize a small but very fast (and more expensive) transitory non-volatile storage in combination with a much larger but slower (and less expensive) non-volatile storage; techniques for which are described by Buchko. In the case where a small transitory non-volatile storage 205 is used a larger non-volatile storage which may be a disk internal to the message delivery system 200 or an external storage device is required. External storage devices are accessible by standard storage area network (SAN) technologies such as fiber channel, iSCSI, FCoE, SAS, eSATA, infiniband or other. The connection to external storage 207 is a device that converts between the system bus 201 and the SAN, an example of such a device is known in the art as a host bus adaptor or HBA. Use of an external storage offers the advantage that it can be reachable from other systems which may be used to facilitate system level redundancy.

The connection to mate 208 is an optional component that is used to communicate state information to a mate system for redundancy. In some implementations of an assured message delivery system the connection to mate 208 may be combined with the non-volatile storage 205 as described by Buchko. The connection to mate 208 is used to transfer messages along with state information about the messages and the destinations for the messages. The connection to mate 208 could be a dedicated point to point link implemented using proprietary technology or it could be implemented using standard networking technology such as Ethernet, TCP/IP, Infiniband or other.

The optional matching engine 206 is a hardware engine designed to offload the microprocessor 204 of the task of matching. In many implementations the matching is performed by the microprocessor 204. Message delivery systems deliver messages received from publishing clients to subscribing clients that have indicated an interest in receiving messages that match a certain criteria. In many implementations the publishing clients add a meta-data topic to the message; this topic is compared by the message delivery system 200 to interests that it has collected from subscribing clients in a process called matching. For each message received from a publishing client the message delivery system 200 will deliver a copy of the message to each subscribing client that registered a matching interest (also known as a subscription). Alternately the message delivery system 200 could use aspects of the message content itself to match published messages to interests from subscribing clients. The process of matching can be an onerous task when there are large topic sets and large numbers of interests. In these situations the application of a hardware engine designed specifically to perform the task such as the matching engine 206 can enhance system performance. A publishing client may instead add a meta-data queue name or identifier to the message; this queue name or identifier is used to route the message to the correct named queue. The optional matching engine 206 can also be used to offload microprocessor 204 the task of determining the destination queue.

Figure 3:
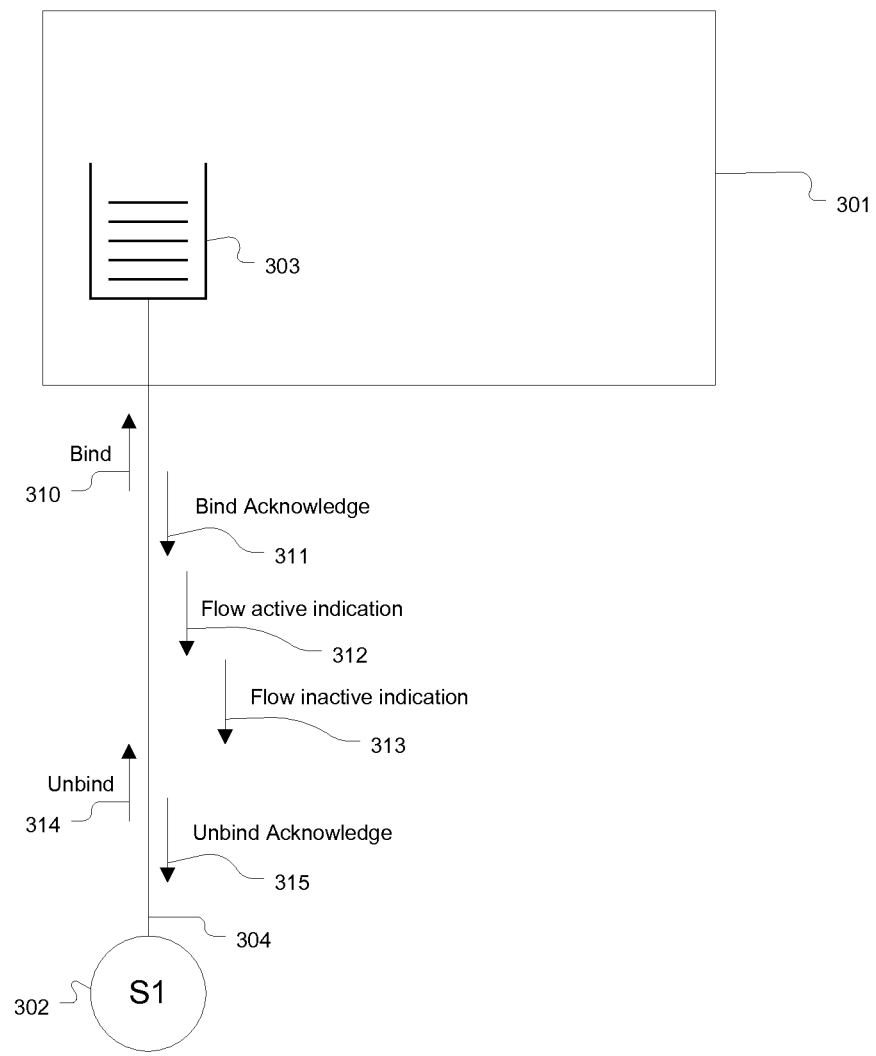
FIG. 3 shows example interactions of a subscribing client with a queue for notification.

FIG. 3 shows example interactions of a subscribing client 302 with a queue 303 of message delivery system 301 for notification of whether it is an active or an inactive subscribing client for the queue 303. The subscribing client 302 is connected over communication path 304 to the message delivery system 301. Communication path 304 could be implemented using any standard networking technology such as TCP/IP. The communication path 304 is a logical connection, in reality subscribing client 302 and the message delivery system 301 are typically connected by one or more switches, routers, transmission equipment, and physical links. FIG. 3 only shows certain interactions specifically involved with a queue active notification; there are many other interactions not shown involving connecting to and authenticating with the message delivery system 301, receiving messages, acknowledging message delivery, keep-alive or heartbeat messages to allow the message delivery system 301 and the subscribing client 302 to know each other are present, etc.

Subscribing client 302 requests a connection to the queue 303 via a bind request 310. A bind request 310 indicates which queue to connect to, and can provide other parameters for the connection such as receive window sizes and other delivery policies. The bind request 310 could optionally provide a priority to indicate the preference of the client to be selected as the active client (the priority value 142 of FIG. 1). Alternatively, the priority value could be an administered property of the subscribing client on message delivery system 301, determined through the client authentication procedure (not shown), or through other techniques. The message delivery system 301 returns a bind acknowledge 311 to indicate to the subscribing client 302 whether the bind request was successful or not. The bind acknowledgement 302 could also optionally contain a notification of whether the subscribing client 302 is currently active or not for the queue 303, or a separate flow active indication 312 or a flow inactive indication 313 could be sent instead after the bind acknowledgement. Due to activity of other subscribing clients (not shown in FIG. 2) or administrative actions on the message delivery system 301, a given subscribing client 302 can later become active or inactive for queue 303. This is indicated to the subscribing client 302 by the message delivery system 301 sending a flow active indication 312 or a flow inactive indication 313. The subscribing client can request to be disconnected from the queue 303 by sending an unbind request 314, and the message delivery system will acknowledge this with a flow unbind acknowledge 315. The subscribing client 302 can also be unbound from the queue 303 through an administrative action on the message delivery system 301, in which case the message delivery system can send an unbind acknowledgement 315 to the subscribing client 302 to tell it that it has been asynchronously unbound from the queue 303. This would also tell the subscribing client 302 that it is no longer active for the queue 303 if it previously was active. Message delivery system 301 could choose to send an explicit flow inactive indication 313 before the unbind acknowledgement 315. A subscribing client 302 can also be unbound from the queue 303 due to a failure in the communication path 304 that is detected by the message delivery system 301 through use of "keep-alive" or "heartbeat" handshakes or other techniques known in the art. In this case, subscribing client 302 is automatically unbound from the queue 303, and if it had been active, another subscribing client bound to queue 303, if any, will be selected and notified that it is now active via a flow active indication 312. Note that in this scenario, when the subscribing application logic (typically implemented in an Application Programming Interface used to interact with message delivery system 301) detects that it has been disconnected from the message delivery system 301 and thus unbound from queue 303, it must indicate to the application logic that it is no longer an active application for queue 303 (as if it received a flow inactive indication 313 or an asynchronous unbind acknowledgement 315 as per above). Another scenario is another subscribing client of higher priority binds to the queue 303. This would cause message delivery system 301 to indicate to the previously active subscriber 302 that it is no longer active by sending it a flow inactive indication 313, and the message delivery system 301 would send a flow active indication 312 to the higher priority new active subscribing client. In the case of maximum active count 162 greater than 1, this scenario would occur if a newly binding subscriber becomes one of the set of active subscribers allowed for queue 303, and a previous active subscriber 302 is no longer one of the set of highest priority bound subscribing clients for queue 303 and becomes an inactive subscribing client.

In FIG. 3 the flow active indication 312 and the flow inactive indication 313 are shown without acknowledgements, but such messages could optionally also be acknowledged, that is, the subscribing client 302 could return an acknowledge back to the message delivery system 301 after receiving the flow active indication 312 or the flow inactive indication 313. This allows the message delivery system 301 to re-transmit these messages if they are not acknowledged in a timely manner.

Figure 4:
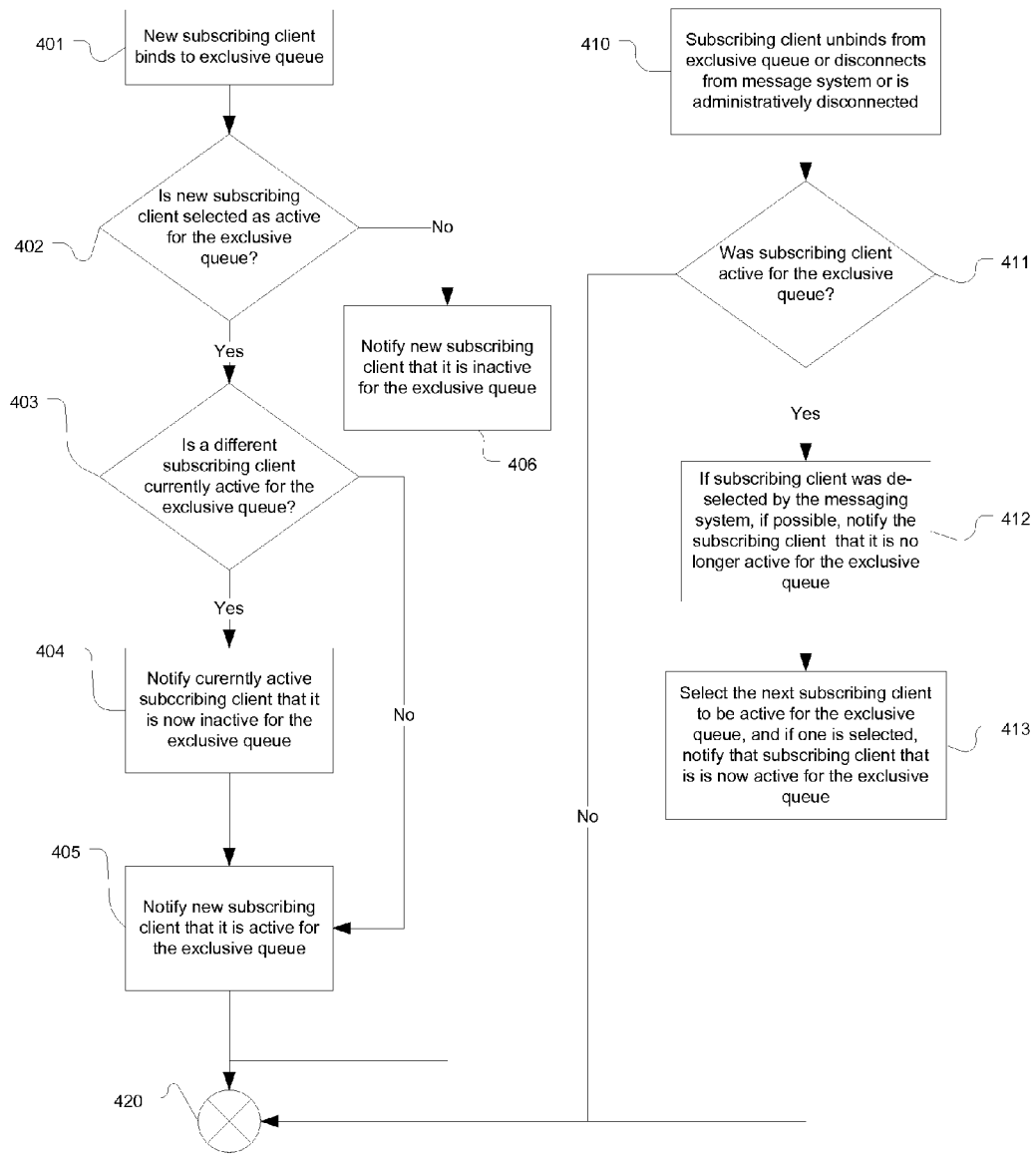
FIG. 4 shows a flow chart describing processing steps performed by the message delivery system in the present invention.

FIG. 4 is a flow chart that shows the processing steps involved in queue activity notifications. The first stimulus to the flow chart starts at step 401, in which a subscribing client 302 binds to a queue 303, by sending in a bind request 310. As explained earlier, the bind request 310 could contain an optional priority value, or a priority value could be determined by other means. At step 402, a determination is made as to whether this new subscribing client 302 has been selected as active for the queue 303. The state information 140 is also updated to include this new subscribing client, its priority if priority is in use, and the decision of whether subscribing client 302 is active or not for queue 303. If yes, the logic proceeds to step 403, where a check is made to see if there was already an active client for the queue 303 that is now being replaced by the new subscribing client 302. If yes, the logic proceeds to step 404, where the current active subscribing client that is being replaced is notified that it is no longer active for the queue 303 by sending it a flow inactive indication 313. The state information 140 is also updated to indicate that the subscribing client being replaced is now inactive for the queue 303. If there is no currently active subscribing client for the queue 303 that is being replaced at step 403, then the logic continues at step 405. At step 405, the new subscribing client 302 is notified that it is active for the queue 303. As described earlier, this could be an indication given in the bind acknowledgement 311, or by sending a separate flow active indication 312. If the subscribing client 302 is not selected as active at step 402, then the logic proceeds instead to step 406, and the and the subscribing client is notified that it is inactive for the queue 303. As described earlier, this could be an indication given in the bind acknowledgement 311, or by sending a separate flow inactive indication 313. As another alternative, subscribing client 302 could assume it is inactive for queue 303 after binding to it until it receives a flow active indication 312. This would also remove the need to send the flow inactive indication 313 at step 406. Processing completes at step 420.

The second stimulus to the flow chart starts at step 410, where a subscribing client 302 is unbound from the queue 303. This could occur via the subscribing client 302 explicitly sending an unbind request 314, or by the subscribing client 302 disconnecting from the message delivery system, or via an administrative action on the message delivery system, or the message delivery system detecting that it can no longer communicate with the subscribing client 302, or through a number of other possible stimuli. The state information 140 is updated to remove this subscribing client 302 from the state information for the queue. At step 411, a check is made whether the subscribing client 302 being unbound from the queue 303 was an active subscribing client for the queue. If not, then processing completes at step 420. If yes, the logic proceeds to step 412, in which, if possible a flow inactive indication 313 is sent to the unbound subscribing client 302 to tell it that it is no longer active. This may not be possible if the client is no longer in communication with the message delivery system. However, as described above, the Application Programming Logic which interacts with the message delivery system 301 should inform the application logic that it is no longer active for the queue 303 when it detects it is no longer connected to message delivery system 301. If the client explicitly unbound from the queue 303, then the flow inactive indication 313 is optional as the subscribing client 302 explicitly asked to be unbound. At step 413, state information 140 is consulted to see if another subscribing client is available to be chosen as an new active subscribing client. If there are multiple choices, then priority value 142 can be used to choose the highest priority client which is currently not active. If priority is not in use, any other policy can be used, such as selecting the oldest bound client, selecting the newest bound client, or any other policy. If a new subscribing client is selected, then state information 140 is updated to indicate that this client is now active for the queue, and a flow active indication 313 is sent to the new active subscribing client. Processing then completes at step 420.

In step 402, when a new subscribing client binds to queue 111, the immediate flag 161 can optionally be used as part of the selection algorithm. If immediate flag 161 is set (indicating immediate), then when a new higher priority subscribing client is bound to the queue 111, it takes priority over an existing lower priority active subscriber. This makes the new bound subscriber active, and a previously active lower priority subscribing client is made inactive. Thus, the subscribing client priority has immediate effect. However, this may not be desirable in all situations. For example, if a high priority subscribing client is currently active for queue 111 and then that application fails (e.g. restarts), that client will be unbound from queue 111 and another waiting lower priority subscribing client will become active for that queue. When the failed high priority client restarts and rebinds to queue 111, immediate flag 162 controls whether the failed application becomes active immediately upon binding, or simply waits as an inactive client and will be later chosen as the active client if a currently active client later unbinds from queue 111. If immediate flag 162 is not set (indicating non-immediate, or in other words, delayed action), then the binding of a new higher priority subscribing client does not over-ride a currently bound and active lower priority client for queue 111. Instead, when a currently active client unbinds from queue 111 for any reason, state information 140 is consulted at step 413 and the highest priority remaining inactive client is selected to be active. It is sometimes desirable to not allow priority to have immediate effect to stop activity from switching back and forth among subscribing clients if they fail and then recover.

While the above description was in reference to a single example queue 111, it will be appreciated by persons skilled in the art that a message delivery system 104 can simultaneously support multiple queues 111, with each queue having its own associated state information 140 and configuration information 160. A given subscribing client 122-125 can connect or bind to multiple queues at the same time, and can be active for multiple different queues while also being inactive or on standby for multiple different queues. In addition, the same subscribing client 122-125 can also be bound to multiple non-exclusive queues at the same time as being bound to multiple exclusive queues. The present invention also allows message delivery system 104 to serve as an activity election mechanism amongst applications. Queue 111 can serve as an election mechanism. Subscribing clients 122-125 bind to queue 111 to request possible election as active. Flow active indication 312 serves as notification that a given subscribing client 122-125 has been elected as active; flow inactive indication 313 serves as notification that subscribing client 122-125 is not elected (including being un-elected after previously being elected). Priority value 142 allows priority to be taken into account in the election of activity Immediate flag 161 allows control of whether, upon a new subscribing client of highest priority requesting election, whether such election occurs immediately or is delayed until the currently active subscribing client 122-125 is no longer willing or able to be active. Maximum active count 162 allows control of whether a single or multiple applications are allowed to be active, or elected, at a time. Since the message delivery system supports multiple instances of queue 111 and associated state information 140 and configuration information 160, multiple independent election mechanisms are supported. It will be appreciated by persons skilled in the art that many variants of the invention are possible. For example, while this invention was described with an assured message delivery system, it equally can be applied to other qualities of message delivery service, such as a non-assured delivery system.

All references mentioned above are herein incorporated by reference.

We claim:

1. In a message delivery system for delivering messages from publishing clients to subscribing clients, comprising a queue containing messages received from the publishing clients for delivery to a plurality of the subscribing clients bound to the queue, wherein a certain number of said subscriber clients bound to the queue are active at any one time and a remainder of said subscriber clients bound to the queue are inactive at any one time, said active subscriber clients being subscriber clients to whom the message delivery system forwards messages from the queue and said inactive subscriber clients being clients to whom the message delivery system does not forward messages from the queue, and wherein the message delivery system selects the subscriber clients as active or inactive, a method of managing the subscriber clients bound to the queue, comprising:

the message delivery system:
(i) storing state information determining which of the subscriber clients bound to the queue is/are currently active and which of the subscriber clients bound to the queue is/are currently inactive;
(ii) upon a new subscribing client binding to the queue, sending a bind acknowledgement message to said new subscribing client, determining whether said new subscribing client is to be selected as active, and if said new subscribing client is selected as active, sending a flow active indication message generated by the message delivery system to said new subscribing client for the queue indicating that it is currently active to receive messages from the queue originating from publishing client, and if said new subscribing client is selected as inactive, sending a flow inactive indication message generated by the message delivery system to said new subscribing client for the queue indicating that it is currently inactive;
(iii) when the message delivery system selects a previously inactive subscribing client bound to the queue to become active, sending a corresponding notification message generated by the message delivery system to the previously inactive subscribing client; and
(iv) when the message delivery system selects a previously active subscribing client bound to the queue to become inactive, sending a corresponding notification message generated by the message delivery system to the previously active subscribing client indicating that it is currently inactive; and
wherein the message delivery system has a configurable parameter that determines the maximum number of active subscriber clients that can be bound to the queue at any one time; and
wherein when a new subscribing client binds to the queue by sending a bind request message to the message delivery system, the message delivery system sends back a bind acknowledgment message and an indication of active/inactive status.

2. A method as claimed in claim 1, wherein the message delivery system selects which of the plurality of subscribing client(s) is/are selected as an active client(s) based on a priority list.

3. A method as claimed in claim 2, wherein said message delivery system is configurable to determine whether a bind request from a particular new subscribing client takes priority over an existing active subscriber client, causing the existing active subscriber client to become inactive.

4. A method as claimed in claim 1, wherein the indication of active/inactive status is part of the bind acknowledgement request.

5. A method as claimed in claim 1, wherein the indication of active/inactive status is contained in a separate message distinct from the bind acknowledgement request.

6. A method as claimed in claim 1, wherein said certain number of clients that can be active at any one time is one.

7. A method as claimed in claim 1, wherein the message delivery system maintains a table indicating the number of active and inactive clients at any one time and an indication stored in memory of the maximum number of active clients at any one time for the queue.

8. A method as claimed in claim 1, wherein said message delivery system is a content routed message delivery system.

9. A message delivery system for delivering messages from publishing clients to subscribing clients, comprising:
   a queue provisioned for the delivery of messages received from the publishing clients to a plurality of subscriber clients bound to the queue, wherein a certain number of said subscriber clients bound to the queue are active at any one time and a remainder of said subscriber clients bound to the queue are inactive, said active subscriber clients being subscriber clients to whom the message delivery system forwards messages from the queue and said inactive subscriber clients being clients to whom the message delivery system does not forward messages from the queue;
   a look-up table storing state information determining which of the subscriber clients bound to the queue is/are currently active and which of the subscriber clients bound to the queue is/are currently inactive, the selection of said subscriber client as active or inactive being performed by the message delivery system; and
   a processor configured to:
   (i) retrieve the state information to determine which of the subscriber clients bound to the queue is/are currently active and which of the subscriber clients bound to the queue is/are currently inactive;
   (ii) upon a new subscribing client binding to the queue, send a bind acknowledgement message to said new subscribing client, determine whether said new subscribing client is to be selected as active, and if said new subscribing client is selected as active, send a flow active indication message generated by the message delivery system to said new subscribing client for the queue indicating that it is currently active to receive messages from the queue originating from publishing client, and if said new subscribing client is selected as inactive, sending a notification message generated by the message delivery system to said new subscribing client for the queue indicating that it is currently inactive; and
   (iii) when the message delivery system selects a previously inactive subscribing client bound to the queue to become active, send a corresponding notification message generated by the message delivery system to the previously inactive subscribing client; and
   (iv) when the message delivery system selects a previously active subscribing client bound to the queue to become inactive, send a corresponding notification message generated by the message delivery system to the previously active subscribing client indicating that it is currently inactive; and
   wherein the message delivery stores has a configurable parameter that determines the maximum number of active subscriber clients that can be bound to the queue at any one time; and
   wherein the processor sends back a bind acknowledgment message and an indication of active/inactive status when a new subscribing client binds to the queue by sending a bind request message to the message delivery system.

10. A message delivery system as claimed in claim 8, wherein the processor selects which of the plurality of subscribing client(s) is/are selected as an active client(s) based on a priority list.

11. A message delivery system as claimed in claim 9, wherein said message delivery system stores a configurable parameter to determine whether a bind request from a particular new subscribing client takes priority over an existing active subscriber client, causing the existing active subscriber client to become inactive.

12. A message delivery system as claimed in claim 9, wherein the indication of active/inactive status is part of the bind acknowledgement request.

13. A message delivery system as claimed in claim 9, wherein the indication of active/inactive status is contained in a separate message distinct from the bind request.

14. A message delivery system as claimed in claim 9, wherein said certain number of clients that can be active at any one time is one.

* * * * *